(12) United States Patent
Clemen

(10) Patent No.: US 8,696,306 B2
(45) Date of Patent: Apr. 15, 2014

(54) BYPASS DUCT OF A TURBOFAN ENGINE

(75) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 628 days.

(21) Appl. No.: 13/026,816

(22) Filed: Feb. 14, 2011

(65) Prior Publication Data

US 2011/0211947 A1 Sep. 1, 2011

(30) Foreign Application Priority Data

Feb. 26, 2010 (DE) .......................... 10 2010 002 394

(51) Int. Cl.
*F01D 5/14* (2006.01)
*F01D 9/04* (2006.01)
*F02K 3/06* (2006.01)

(52) U.S. Cl.
CPC ................ *F01D 5/141* (2013.01); *F01D 9/041* (2013.01); *F02K 3/06* (2013.01)
USPC ........... 415/144; 415/147; 415/185; 415/195; 415/208.2

(58) Field of Classification Search
CPC ............ F01D 5/141; F01D 9/041; F02K 3/06
USPC ........... 415/183, 185, 191, 195, 208.1, 208.2, 415/144, 147
See application file for complete search history.

(56) References Cited

U.S. PATENT DOCUMENTS

| 2,928,648 | A | * | 3/1960 | Haines et al. | 415/138 |
| 4,989,406 | A | * | 2/1991 | Vdoviak et al. | 415/142 |
| 6,082,966 | A | * | 7/2000 | Hall et al. | 415/209.1 |

* cited by examiner

Primary Examiner — Igor Kershteyn
(74) Attorney, Agent, or Firm — Timothy J. Klima; Shuttleworth & Ingersoll, PLC

(57) ABSTRACT

A guide blade ring (1) arranged downstream of the fan in the bypass duct of a turbofan engine for untwisting the airflow generated by the fan includes guide stator vane support struts (3) integrated into the guide blade ring at regular intervals respectively in place of a guide stator vane, the guide stator vane support struts (3) having a larger thickness and chord length than the guide stator vanes (2). A flow channel (4), respectively defined between a suction side (7) of the guide stator vane support strut and a guide stator vane (2.1) adjacent thereto on the suction side, is expanded by a geometric modification of the guide stator vane (2.1) with respect to the remaining guide stator vanes (2) in accordance with the respective configuration of the guide stator vane support strut.

20 Claims, 1 Drawing Sheet

BYPASS DUCT OF A TURBOFAN ENGINE

Figure 1:
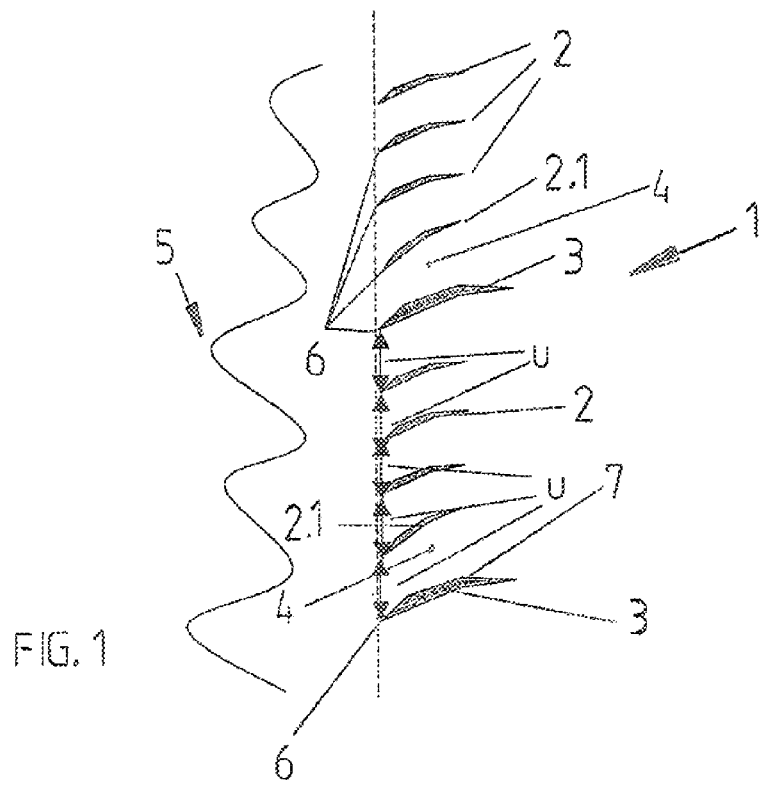

This invention relates to a bypass duct of a turbofan engine comprising guide stator vanes arranged equally spaced in a circumferential direction for untwisting the airflow generated by the fan as well as support struts.

Turbofan engines comprise, downstream of the fan arranged on the air intake side, an airflow separator which divides the airflow generated by the fan into a core airflow and a bypass airflow. The bypass airflow flows into a bypass duct which is formed by an inner sidewall confining a core duct and an engine fairing supported thereon. The support of the engine fairing on the inner side wall is provided by means of equally spaced guide stator vanes (guide wheel vanes) of a guide wheel (guide blade ring) arranged downstream of the fan and adapted to remove the angular momentum from the airflow generated by the fan, as well as by arranging additional support struts which are shaped aerodynamically but dimensioned to be stronger for the supporting function. The support struts for mechanically supporting the bypass duct walls generate pressure losses on the one hand and are, on the other hand, responsible for a longer length and a higher engine weight. In addition, the components provided for the support in the circumferential direction of the bypass duct generate static pressure variations retroacting on the fan, which require a more stable and expensive configuration of the fan. The arrangement and formation of the support struts and the related effects finally result in a considerable fuel consumption.

It is therefore an object underlying the invention to configure the bypass duct of a turbofan engine such that the weight of the engine and the static pressure variations generated upstream of the guide blade ring and acting on the fan can be reduced and, finally, the fuel consumption of the engine is decreased.

According to the invention, this object is solved by a bypass duct provided in accordance with the features described herein. Advantageous developments of the present invention become apparent from the present specification.

A guide blade ring arranged downstream of the fan in the bypass duct of a turbofan engine for untwisting the airflow generated by the fan comprises guide stator vane support struts integrated equally spaced into the guide blade ring, respectively in place of a guide stator vane, said guide stator vane support struts having a larger thickness and chord length than the guide stator vanes. A flow channel respectively present between a suction side of the guide stator vane support strut and a guide stator vane adjacent thereto on the suction side is expanded with respect to further guide stator vanes by a geometric modification of said guide stator vane, which modification depends on the respective configuration of the guide stator vane support strut, such that an equal pressure distribution is secured in the region upstream of the guide blade ring. By integrating the support struts in place of the guide stator vanes into the guide blade ring and the inventive design thereof, the weight of the engine and the flow losses can be reduced. In addition, despite of the inserted guide stator vane support struts, an equal configuration of the circumferential pressure field generated downstream of the guide blade ring is guaranteed, such that the efficiency and the stability of the fan are increased and related engine noise is decreased.

In an embodiment of the invention, the stagger angle of the modified guide stator vane, which is defined by a chord length and an axial chord length of the modified guide stator vane, is enlarged with respect to the stagger angle of the other guide stator vanes for expanding the flow channel, and the leading edge angle and the trailing edge angle of the modified guide stator vane are adapted to the enlarged stagger angle—and accordingly enlarged—for securing a continuous airflow at the guide blade ring.

The geometries of all guide stator vanes are, however, identical in view of leading edge shape, thickness and chord length. The leading edge distances of all guide stator vanes and guide stator vane support struts forming the guide blade ring are also identical.

In a further embodiment of the invention, the guide stator vane support struts and the guide stator vanes of a guide blade ring are mutually arranged in a fixed numerical ratio which is preferably 1:3 or 1:4 or 1:5 or 1:6.

The configurations of the guide stator vane support struts integrated into the guide blade ring can be identical or different. In any case, however, the geometry of the modified guide stator vane is adjusted to the respective geometry of the associated guide stator vane support strut. The non-modified guide stator vanes have a consistent geometry.

Figure 2:
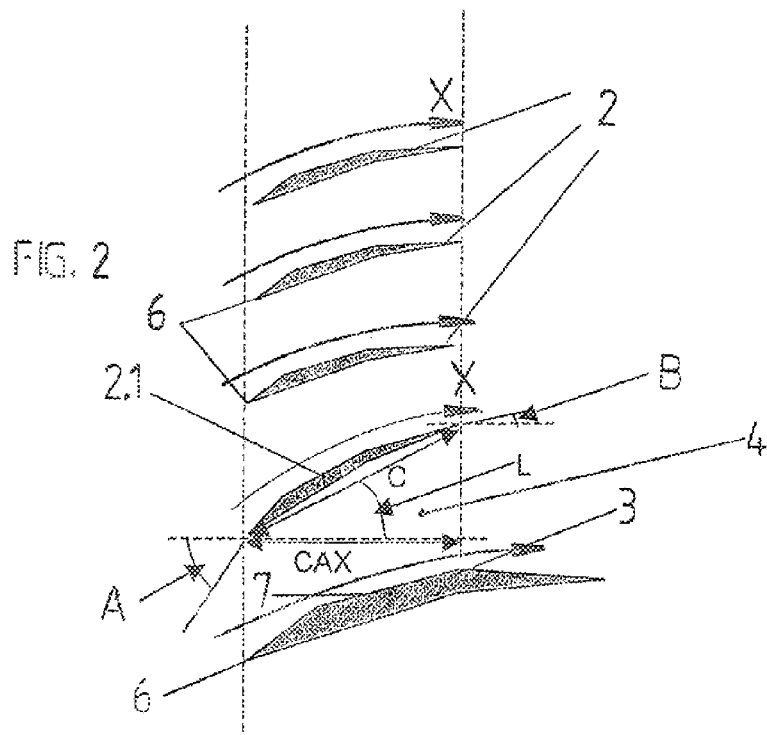

An embodiment of the invention is explained in more detail based on the drawing, in which FIG. 1 shows a partial view of an execution of a guide blade ring arranged downstream of the fan in a bypass duct for untwisting the airflow; and FIG. 2 shows a detailed view in the region of a guide stator vane following a guide stator vane support strut on the suction side and modified for reducing the static pressure field generated on the upstream side.

As is shown in FIG. 1, the guide blade ring 1 arranged in the circumferential direction of the bypass duct between the inner and outer walls thereof (both not shown) comprises a plurality of guide stator vanes 2 (in this example 3) and guide stator vane support struts 3 (in this example 11), which are arranged at regular intervals U with respect to each other. This means that the—aerodynamically encased—support struts usually arranged downstream of the guide blade ring 1 are integrated into the guide blade ring 1 as the guide stator vane support struts 3 at regular intervals 5U, respectively in place of a guide stator vane 2. Whereas the guide stator vanes and the guide stator vane support struts are arranged in a ratio of 4:1 in the present embodiment, also other ratios, e.g. 5:1 or 3:1, can be provided. The guide stator vane support struts 3 integrated into the guide blade ring 1 herein assume the supporting function of the support struts arranged downstream in other respects, and also have, due to their vane shape being adapted to the guide stator vanes 2, a general function for untwisting the airflow supplied by the fan. Due to this double function of the guide stator vane support struts 3, the weight of the engine and consequently the fuel consumption can be reduced.

The pressure loss expected due to the inserted guide stator vane support struts 3 and their larger thickness and chord length compared to the smaller guide stator vanes 2 as well as the non-regular circumferential pressure field 5 formed upstream and acting on the fan and the increased noise level are countered by a changed geometry of the guide stator vane 2.1 respectively following the guide stator vane support strut 3 on the suction side. Upon an unchanged distance U between the leading edges 6 of the guide stator vanes 2 and the guide stator vane support struts 3, the geometry of the guide stator vane 2.1 arranged opposite to the suction side 7 of the guide stator vane support strut 3 is modified such that the width of the flow channel 4 existing therebetween is enlarged by a larger stagger angle L. The stagger angle L is the angle defined by the chord length C of the guide stator vane 2.1 and the axial chord length CAX.

In accordance with the possibly differing geometry of the guide stator vane support struts 3, the stagger angle L is changed and, simultaneously, the leading edge angle A and the trailing edge angle B of the guide stator vane 2.1 are adapted accordingly, such that the downstream flow (or outflow) (arrow X) at the modified guide stator vane 2.1 substantially corresponds to the downstream flow at the remaining guide stator vanes 2. Other vane parameters, such as the chord length C or the axial chord length CAX or also the vane thickness and the shape of the leading edge remain unchanged. Consequently, the mechanic characteristics of the modified guide stator vane 2.1 are not changed. Due to the integration of the support struts (guide stator vane support struts 3) into the guide blade ring 1, the pressure losses to be expected as well as the pressure acting on the fan on the upstream side can be reduced by 30% or 50%, respectively, by enlarging the stagger angle L in combination with adapting the leading edge angle A and the trailing edge angle B, such that the operating stability and the efficiency of the fan and the noise caused by same, and finally also the fuel consumption, can be further decreased.

LIST OF REFERENCE NUMERALS

1 guide blade ring (partial execution)
2 guide stator vanes
2.1 modified guide stator vane arranged on the suction side of 3
3 guide stator vane support strut
4 expanded flow channel between 3 and 2.1
5 circumferential pressure field
6 leading edges of 2, 3
7 suction side of 3
U distance/leading edge distance of 2, 2.1, 3
5U distance between the leading edges of 3
L stagger angle
C chord length of 2.1
CAX axial chord length of 2.1
A leading edge angle of 2.1
B trailing edge angle of 2.1
arrow X downstream flow of air at 2.1, 2

What is claimed is:

1. A bypass duct of a turbofan engine comprising:
a guide blade ring including a plurality of guide stator vanes arranged at regular intervals in a circumferential direction around a circumference of the bypass duct for altering a direction of airflow generated by a fan of the turbofan engine, the plurality of stator vanes including a plurality of regular guide stator vanes, a plurality of guide stator vane support struts and a plurality of modified guide stator vanes;
the guide stator vane support struts having a larger thickness and chord length than the regular guide stator vanes and an aerodynamic shape adapted thereto;
the modified guide stator vanes positioned adjacent respective suction sides of the guide stator vane support struts and having a different geometry as compared to the regular guide stator vanes to form expanding flow channels between pressure sides of the modified guide stator vanes and the adjacent respective suction sides of the guide stator vane support struts, the expanding flow channels for reducing pressure peaks of a circumferential pressure field building up on an upstream side of the guide blade ring, the different geometry configured in accordance with a configuration of the regular guide stator vane support struts.

2. The bypass duct in accordance with claim 1, wherein each of the stator vanes has a stagger angle defined by a chord length and an axial chord length thereof, and the different geometry results from the modified guide stator vanes having a stagger angle greater than a stagger angle of the regular guide stator vanes, wherein leading edge angles and trailing edge angles of the modified guide stator vanes are adapted to the greater stagger angle of the modified guide stator vanes to form a downstream flow of air from the modified guide stator vanes that corresponds substantially in direction to a downstream flow of air from the regular guide stator vanes.

3. The bypass duct in accordance with claim 2, wherein geometries of the regular guide stator vanes and the modified guide stator vanes are identical with regard to leading edge shape, thickness and chord length.

4. The bypass duct in accordance with claim 3, wherein the guide stator vane support struts are arranged in a fixed numerical ratio with respect to a combined quantity of the regular guide stator vanes and the modified guide stator vanes.

5. The bypass duct in accordance with claim 3, wherein the fixed numerical ratio is within a range of 1:3 to 1:6.

6. The bypass duct in accordance with claim 5, wherein configurations of the guide stator vane support struts are identical.

7. The bypass duct in accordance with claim 5, wherein configurations of the guide stator vane support struts are different.

8. The bypass duct in accordance with claim 1, wherein geometries of the regular guide stator vanes and the modified guide stator vanes are identical with regard to leading edge shape, thickness and chord length.

9. The bypass duct in accordance with claim 8, wherein the guide stator vane support struts are arranged in a fixed numerical ratio with respect to a combined quantity of the regular guide stator vanes and the modified guide stator vanes.

10. The bypass duct in accordance with claim 9, wherein the fixed numerical ratio is within a range of 1:3 to 1:6.

11. The bypass duct in accordance with claim 10, wherein configurations of the guide stator vane support struts are identical.

12. The bypass duct in accordance with claim 10, wherein configurations of the guide stator vane support struts are different.

13. The bypass duct in accordance with claim 1, wherein the guide stator vane support struts are arranged in a fixed numerical ratio with respect to a combined quantity of the regular guide stator vanes and the modified guide stator vanes.

14. The bypass duct in accordance with claim 13, wherein the fixed numerical ratio is within a range of 1:3 to 1:6.

15. The bypass duct in accordance with claim 14, wherein configurations of the guide stator vane support struts are identical.

16. The bypass duct in accordance with claim 14, wherein configurations of the guide stator vane support struts are different.

17. The bypass duct in accordance with claim 2, wherein the guide stator vane support struts are arranged in a fixed numerical ratio with respect to a combined quantity of the regular guide stator vanes and the modified guide stator vanes.

18. The bypass duct in accordance with claim 17, wherein the fixed numerical ratio is within a range of 1:3 to 1:6.

19. The bypass duct in accordance with claim 18, wherein configurations of the guide stator vane support struts are identical.

20. The bypass duct in accordance with claim 18, wherein configurations of the guide stator vane support struts are different.

\* \* \* \* \*